(12) United States Patent
Niimi et al.

(10) Patent No.: US 8,028,514 B2
(45) Date of Patent: Oct. 4, 2011

(54) EXHAUST GAS PURIFICATION SYSTEM FOR INTERNAL COMBUSTION ENGINE AND METHOD FOR REGENERATING PURIFICATION ABILITY OF EXHAUST GAS PURIFICATION DEVICE

(75) Inventors: Kuniaki Niimi, Susono (JP); Kenichi Tsujimoto, Susono (JP); Tomihisa Oda, Numazu (JP); Shinya Hirota, Susono (JP); Takanori Ueda, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 784 days.

(21) Appl. No.: 12/083,242

(22) PCT Filed: Sep. 19, 2006

(86) PCT No.: PCT/JP2006/318896
§ 371 (c)(1),
(2), (4) Date: Apr. 8, 2008

(87) PCT Pub. No.: WO2007/046216
PCT Pub. Date: Apr. 26, 2007

(65) Prior Publication Data
US 2009/0178392 A1    Jul. 16, 2009

(30) Foreign Application Priority Data
Oct. 18, 2005    (JP) .................. 2005-302861

(51) Int. Cl.
*F01N 3/00* (2006.01)

(52) U.S. Cl. ............... 60/286; 60/274; 60/287; 60/292; 60/295; 60/324

(58) Field of Classification Search .............. 60/274, 60/286, 287, 292, 295, 301, 303, 324
See application file for complete search history.

(56) References Cited

U.S. PATENT DOCUMENTS
5,406,790 A    4/1995    Hirota et al.
(Continued)

FOREIGN PATENT DOCUMENTS
DE    196 26 837 A1    1/1997
(Continued)

*Primary Examiner* — Binh Q Tran
(74) *Attorney, Agent, or Firm* — Oliff & Berridge, PLC (57) ABSTRACT

The problem is to regenerate the purification ability of an exhaust gas purification device more reliably or efficiently in an exhaust gas purification system that combines a plurality of branch passages branch off from an exhaust gas passage and exhaust gas purification devices. When the purification ability of an exhaust gas purification device is regenerated, in the branch passage where the exhaust gas purification device is provided whose purification ability is to be regenerated, the opening angle of an exhaust gas flow volume control valve is set to the minimum opening angle that can reliably transport a reducing agent that is added from a reducing agent addition section. While the opening angle is maintained, the reducing agent is added. After the addition of the reducing agent is complete, the opening angle of an exhaust gas flow volume control valve is closed completely.

8 Claims, 4 Drawing Sheets

U.S. PATENT DOCUMENTS

| | | | |
|---|---|---|---|
| 6,192,675 B1 * | 2/2001 | Hirota et al. | 60/286 |
| 6,779,339 B1 * | 8/2004 | Laroo et al. | 60/297 |
| 6,823,664 B2 * | 11/2004 | Nakatani et al. | 60/295 |
| 6,877,312 B2 * | 4/2005 | Nakatani et al. | 60/288 |
| 7,107,761 B2 * | 9/2006 | Fukuma et al. | 60/285 |
| 7,219,491 B2 | 5/2007 | Nakatani | |
| 7,640,728 B2 * | 1/2010 | Yoshizaki et al. | 60/286 |
| 7,770,386 B2 * | 8/2010 | Lowe et al. | 60/295 |
| 2004/0006975 A1 | 1/2004 | Stroia et al. | |

FOREIGN PATENT DOCUMENTS

| | | |
|---|---|---|
| EP | 1 055 806 A2 | 11/2000 |
| JP | A 2003-074328 | 3/2003 |
| JP | A 2003-106142 | 4/2003 |
| JP | A 2004-052603 | 2/2004 |

* cited by examiner

EXHAUST GAS PURIFICATION SYSTEM FOR INTERNAL COMBUSTION ENGINE AND METHOD FOR REGENERATING PURIFICATION ABILITY OF EXHAUST GAS PURIFICATION DEVICE

TECHNICAL FIELD

The present invention relates to an exhaust gas purification system for an internal combustion engine and to a method for regenerating the purification ability of an exhaust gas purification device.

BACKGROUND ART

The exhaust gas of an internal combustion engine contains harmful substances such as nitrogen oxides (NOx) and the like. It is known that an exhaust system of an internal combustion engine is provided with a NOx catalyst to remove NOx from the exhaust gas in order to reduce emissions of these harmful substances. With this technology, for example, when a NOx storage-reduction catalyst is provided, the purification ability drops if the amount of stored NOx increases, so a reducing agent is supplied to the NOx storage-reduction catalyst, and the NOx stored in the catalyst is reduced and discharged. (Hereinafter, this process is called "NOx reduction processing".) Sulfur oxides (SOx) in the exhaust gas are also stored in the NOx catalyst, which results in SOx poisoning that reduces the purification ability of the catalyst. To eliminate the SOx poisoning, sometimes the bed temperature of the NOx catalyst is increased and a reducing agent is added. (Hereinafter, this process is called "SOx regeneration processing".)

It is also known that when a reducing agent is supplied to an exhaust gas purification device, such as a NOx catalyst or the like, and the purification ability is regenerated, as described above, it is desirable to reduce the flow volume of the exhaust gas that is introduced into the exhaust gas purification device, so as to ensure sufficient time for diffusion and reaction of the supplied reducing agent within the exhaust gas purification device.

For this purpose, technologies have been proposed, as disclosed in Japanese Patent Application Publication No. JP-A-2003-106142 and Japanese Patent Application Publication No. JP-A-2003-74328, whereby a plurality of branch passages are provided in an exhaust gas purification system, and an exhaust gas purification device is provided in each branch passage. (Hereinafter, the expression "exhaust gas purification system" is used to refer to one or more exhaust gas purification devices and an associated control system.) With these technologies, the flow volume of the exhaust gas that is introduced into any one of the exhaust gas purification devices is decreased to a prescribed volume by means of a valve that varies the cross-sectional area of a flow passage, and fuel is supplied as a reducing agent to an exhaust gas purification device for which the flow volume of introduced exhaust gas has been reduced. This allows the supplied fuel to be used efficiently to regenerate the purification ability of the exhaust gas purification device. It also limits the effect on the operating performance of the internal combustion engine. A related technology is proposed in, for example, Japanese Patent Application Publication No. JP-A-2004-52603. With this technology, when NOx reduction processing is carried out for the NOx catalyst, a switching valve is changed from a forward flow setting to a reverse flow setting or vice versa. By this method, the volume of exhaust gas within the NOx catalyst is reduced by changing a valve setting. The reducing agent is supplied after a prescribed amount of time has elapsed from the time the valve switching signal was generated.

However, with the technology described above, when the flow volume of the exhaust gas in the exhaust gas purification device was reduced at a constant speed, for example, there was a risk that the reducing agent would not arrive at the exhaust gas purification device with the timing at which the reducing agent should be added. There was also a risk that the reducing agent would pass through the exhaust gas purification device and escape. As a result, it was sometimes difficult to supply the reducing agent to the entire exhaust gas purification device reliably and to regenerate the purification ability efficiently.

The present invention provides a technology that more reliably or more efficiently regenerates the purification ability of an exhaust gas purification device in an exhaust gas purification system that combines a plurality of branch passages that branch off from an exhaust gas passage and an exhaust gas purification device that is provided in each branch passage.

DISCLOSURE OF THE INVENTION

An exhaust gas purification system according to the present invention is mainly characterized by the points described below. Specifically, it includes a plurality of branch passages that branch off from an exhaust gas passage and in each branch passage, an exhaust gas purification device, a reducing agent addition means, and an exhaust gas flow volume control valve. When purification ability regeneration processing is carried out in the exhaust gas purification device, in the branch passage where the exhaust gas purification device is provided in which the regeneration processing is to be carried out, the opening angle of the exhaust gas flow volume control valve is set to a prescribed first opening angle that is closer to being closed than the opening angle was before the regeneration processing started. The reducing agent is then added from the reducing agent addition section while the first opening angle is maintained.

Specifically, the exhaust gas purification system is characterized by including:

the exhaust gas passage, one end of which is connected to an internal combustion engine and through which exhaust gas from the internal combustion engine passes, and which is divided into the plurality of branch passages;

the exhaust gas purification device provided in each of the plurality of branch passages, each exhaust gas purification device purifying the exhaust gas that passes through the branch passage in which it is provided;

the exhaust gas flow volume control valve provided in each of the plurality of branch passages, each exhaust gas flow volume control valve controlling the flow volume of the exhaust gas that passes through the branch passage in which it is provided;

the reducing agent addition section provided in each of the plurality of branch passages upstream from the exhaust gas purification device, each of which reducing agent addition section adds a reducing agent to the exhaust gas that passes through the branch passage in which it is provided; and purification ability regeneration control section, wherein when the reducing agent is supplied to the exhaust gas purification device that is provided in one of the plurality of branch passages and purification ability regeneration processing is carried out in the exhaust gas purification device, in the branch passage where the exhaust gas purification device is provided in which the regeneration processing is to be carried out, the opening angle of the exhaust gas flow volume control valve is set to a prescribed first opening angle that is closer to being closed than the opening angle was before the regeneration processing started;

the reducing agent is added from the reducing agent addition means during a period when the opening angle of the exhaust gas flow volume control valve is maintained at the first opening angle; and after addition of the reducing agent is complete, the opening angle of the exhaust gas flow volume control valve is set to a prescribed second opening angle that is closer to being closed than the first opening angle.

Here, the case will be considered where the reducing agent is supplied to an exhaust gas purification device in any one of the branch passages to regenerate the purification ability of the exhaust gas purification device. In this sort of case, the flow of the exhaust gas in the branch passage where the exhaust gas purification device is provided is ordinarily cut off by closing the exhaust gas flow volume control valve. In conjunction with the closing of the valve, the reducing agent addition section that is provided upstream from the exhaust gas purification device adds the reducing agent to the exhaust gas that is flowing into the exhaust gas purification device.

Here, the cases will be considered where, for example, the exhaust gas flow volume control valve is closed at a constant speed or is closed such that the flow volume of the exhaust gas is reduced at a constant speed. (Hereinafter, these cases will be referred to collectively as "closing the exhaust gas flow volume control valve in a uniform manner".) In these cases, depending on the relationship between the opening angle of the exhaust gas flow volume control valve and the timing of the reducing agent addition by the reducing agent addition section, there is a risk that a portion of the added reducing agent will not reach the exhaust gas purification device or will pass through the exhaust gas purification device and escape. Either way, that portion of the reducing agent cannot be used to regenerate the purification ability of the exhaust gas purification device. It is therefore difficult to complete purification ability regeneration processing in the exhaust gas purification device efficiently.

Therefore, in accordance with the present invention, an exhaust gas purification system that includes a plurality of branch passages that branch off from an exhaust gas passage and in each branch passage, an exhaust gas purification device, a reducing agent addition section, and an exhaust gas flow volume control valve, is implemented as described below. Specifically, when the purification ability of an exhaust gas purification device is regenerated, in the branch passage where the exhaust gas purification device is provided whose purification ability is to be regenerated, the exhaust gas flow volume control valve is closed to the prescribed first opening angle, which is closer to being closed than the opening angle was before the regeneration processing started. The reducing agent is then added from the reducing agent addition section while the first opening angle is maintained. After the addition of the reducing agent is complete, the exhaust gas flow volume control valve is set to the second opening angle, which is closer to being closed than the first opening angle.

Here, the first opening angle is closer to being closed than the mid-point of the range of variation in the opening angle of the exhaust gas flow volume control valve in regeneration processing. Specifically, the range of variation in the opening angle is a range from the opening angle of the exhaust gas flow volume control valve before regeneration processing started to the second opening angle, at which the exhaust gas flow volume control valve is finally set. The first opening angle may be set to the minimum opening angle at which the reducing agent that is added from the reducing agent addition section can be reliably transported. The second opening angle is an opening angle that, when set as the opening angle of the exhaust gas flow volume control valve, ensures that the flow volume of the exhaust gas that passes through the exhaust gas purification device is low enough that sufficient time is ensured for the reducing agent that is added from the reducing agent addition section to diffuse and react inside the exhaust gas purification device. The second opening angle may be, for example, the opening angle when the valve is completely closed.

Accordingly, in the branch passage where the exhaust gas purification device is provided whose purification ability is to be regenerated, the flow volume of the exhaust gas is first reduced by setting the exhaust gas flow volume control valve to the first opening angle. The reducing agent is then added from the reducing agent addition section during the period when the opening angle of the exhaust gas flow volume control valve is maintained at the first opening angle.

Therefore, even if errors occur to some degree in the timing of the addition of the reducing agent from the reducing agent addition section, variations in the state of diffusion of the reducing agent in the exhaust gas purification device as a result of timing errors can be suppressed. As a result, the reducing agent can be more stably diffused throughout the entire exhaust gas purification device than when the opening angle of the exhaust gas flow volume control valve is changed in a uniform manner. Also, because the flow volume of the exhaust gas at this time is decreased, the period during which the reducing agent is added can itself be made longer, and the amount of the reducing agent that is added can be controlled more precisely. And the timing at which the exhaust gas flow volume control valve is closed to the second opening angle after the addition of the reducing agent is complete is no longer required to be highly precise.

As a result, the purification ability regeneration processing in the exhaust gas purification device can be completed more reliably or more efficiently.

In accordance with the present invention, a prescribed no-adding-of-reducing-agent interval, during which the reducing agent is not added, may also be established before and/or after the period when the reducing agent is added during the period when the opening angle of the exhaust gas flow volume control valve is maintained at the first opening angle.

For example, the system may be set such that, during the period when the opening angle of the exhaust gas flow volume control valve is maintained at the first opening angle in the branch passage where the exhaust gas purification device is provided whose purification ability is to be regenerated, the reducing agent is added by the reducing agent addition section after a front-end no-adding-of-reducing-agent interval has elapsed. And the system may be set such that, after the addition of the reducing agent is complete, the system waits until after a back-end no-adding-of-reducing-agent interval has elapsed before closing the exhaust gas flow volume control valve to the second opening angle.

If the system is thus set, ensuring the front-end no-adding-of-reducing-agent interval makes it possible to add the reducing agent after the flow volume of the exhaust gas that is introduced into the exhaust gas purification device whose purification ability is to be regenerated has decreased to the flow volume produced by the first opening angle of the exhaust gas flow volume control valve, for example, the minimum flow volume at which the reducing agent can be reliably transported. Also, ensuring the back-end no-adding-of-reducing-agent interval makes it possible to ensure sufficient time for the reducing agent that is added to the exhaust gas to be introduced into the exhaust gas purification device and to diffuse throughout the entire exhaust gas purification device. As a result, the reducing agent can diffuse more reliably throughout the entire exhaust gas purification device, with neither an excess nor a shortage, so that purification ability regeneration processing in the exhaust gas purification device can be completed more efficiently.

Note that it is not necessary for the front-end no-adding-of-reducing-agent interval and the back-end no-adding-of-reducing-agent interval to be of the same duration. The optimum length of time for the flow volume of the exhaust gas that is introduced into the exhaust gas purification device whose purification ability is to be regenerated to decrease to the flow volume produced by the first opening angle of the exhaust gas flow volume control valve may be empirically determined in advance and then set as the front-end no-adding-of-reducing-agent interval. The optimum length of time for the reducing agent that is added to the exhaust gas to be introduced into the exhaust gas purification device and to diffuse throughout the entire exhaust gas purification device may also be empirically determined in advance and then set as the back-end no-adding-of-reducing-agent interval. The optimum values for both intervals may also be varied according to the operating state of the internal combustion engine. It is also acceptable to provide only the front-end no-adding-of-reducing-agent interval or only the back-end no-adding-of-reducing-agent interval.

Also, in accordance with the present invention, when the purification ability regeneration control section decreases the opening angle of the exhaust gas flow volume control valve from the first opening angle to the second opening angle, the valve may be closed at a valve-closing speed at least as fast as a prescribed first speed.

Here, at the point in time when the valve-closing operation starts for the exhaust gas flow volume control valve, the prescribed first speed serves as a threshold value for the speed at which the exhaust gas flow volume control valve can close to the second opening angle while the reducing agent is maintained in a state of sufficient diffusion in the exhaust gas purification device. The first speed may be empirically determined in advance. If this is done, at the point in time when the reducing agent that was added by the reducing agent addition section has diffused throughout the entire exhaust gas purification device, the flow volume of the exhaust gas that passes through the exhaust gas purification device can be rapidly reduced to a flow volume that is sufficiently small to ensure enough time for the reducing agent that was added by the reducing agent addition section to diffuse further inside the exhaust gas purification device and react. As a result, the reducing agent can diffuse more reliably throughout the entire exhaust gas purification device, with neither an excess nor a shortage.

Also, in accordance with the present invention, when the purification ability regeneration control section decreases the opening angle of the exhaust gas flow volume control valve to the first opening angle, the valve may close at a speed that is slower than the speed at which the valve closes when, after the reducing agent is added, the opening angle of the exhaust gas flow volume control valve is reduced from the first opening angle to the second opening angle.

Because the valve-closing speed can be set to be slow when the opening angle of the exhaust gas flow volume control valve is set to the first opening angle, sudden changes in the back pressure in the exhaust gas passage can be suppressed, thereby inhibiting deterioration in driveability due to sudden fluctuations in the engine torque. Also, because the opening angle of the exhaust gas flow volume control valve is set to the first opening angle slowly, the valve can be controlled with greater precision, and the opening angle of the exhaust gas flow volume control valve can be set to the first opening angle more accurately.

The method for regenerating the purification ability of the exhaust gas purification device in accordance with the present invention regenerates the purification ability by supplying the reducing agent to any one exhaust gas purification device that is provided in any one of the plurality of branch passages that are formed by branching off from the exhaust gas passage of the internal combustion engine. The method is characterized by including:

a first flow volume reduction process, which, in the branch passage where the exhaust gas purification device is provided whose purification ability is to be regenerated, reduces the flow volume of the exhaust gas to a prescribed first flow volume, which is less than the flow volume prior to the start of regeneration;

a reducing agent addition process, which is carried out after the first flow volume reduction process, maintains the flow volume of the exhaust gas at the first flow volume, and adds the reducing agent to the exhaust gas;

a second flow volume reduction process, which is carried out after the reducing agent addition process and reduces the flow volume of the exhaust gas to a prescribed second flow volume that is less than the first flow volume.

Here, the first flow volume is less than the mid-point of the range of variation in the flow volume of the exhaust gas in regeneration processing. Specifically, the range of variation in the flow volume is a range from the flow volume of the exhaust gas before regeneration processing started to the second flow volume, at which the flow volume of the exhaust gas is finally set. The first flow volume may be set to the minimum flow volume of the exhaust gas at which the reducing agent can be reliably transported to the exhaust gas purification device. The second flow volume is a flow volume of the exhaust gas that is low enough that sufficient time is ensured for the added reducing agent to diffuse and react inside the exhaust gas purification device. The second flow volume may be set to approximately zero.

Accordingly, in the branch passage where the exhaust gas purification device is provided whose purification ability is to be regenerated, the flow volume of the exhaust gas is first reduced by the first flow volume reduction process. In the reducing agent addition process, the reducing agent can then be added to the exhaust gas while the flow volume of the exhaust gas that is introduced into the exhaust gas purification device whose purification ability is to be regenerated is maintained at the first flow volume.

Therefore, even if errors occur to some degree in the timing of the addition of the reducing agent into the exhaust gas, variations in the state of diffusion of the reducing agent in the exhaust gas purification device as a result of timing errors can be suppressed. As a result, the reducing agent can be more stably diffused throughout the entire exhaust gas purification device than when the flow volume of the exhaust gas is changed at a constant speed. Also, because the flow volume of the exhaust gas at this time is decreased, the period during which the reducing agent is added can itself be made longer, and the amount of the reducing agent that is added can be controlled more precisely. And in the second flow volume reduction process, the timing at which the flow volume of the exhaust gas is set to the second flow volume is no longer required to be highly precise.

As a result, the purification ability regeneration processing in the exhaust gas purification device can be completed more reliably or more efficiently.

In the method for regenerating the purification ability of the exhaust gas purification device in accordance with the present invention, a prescribed no-adding-of-reducing-agent interval, during which the flow volume of the exhaust gas is maintained at the first flow volume and the reducing agent is not added, may also be established in the reducing agent addition process, before and/or after the period when the reducing agent is added.

If the system is thus set, ensuring the front-end no-adding-of-reducing-agent interval makes it possible to add the reducing agent to the exhaust gas after the flow volume of the exhaust gas in the branch passage where the exhaust gas purification device is provided whose purification ability is to be regenerated has sufficiently stabilized at the first flow volume. Also, ensuring the back-end no-adding-of-reducing-agent interval makes it possible to ensure sufficient time after the addition of the reducing agent is complete for the added reducing agent to diffuse throughout the entire exhaust gas purification device. As a result, the purification ability regeneration processing in the exhaust gas purification device can be completed more reliably or more efficiently.

In the method for regenerating the purification ability of the exhaust gas purification device in accordance with the present invention, the system may also be set such that, in the second flow volume reduction process, when the flow volume of the exhaust gas is reduced to the second flow volume, the speed of decrease in the flow volume of the exhaust gas is a prescribed second speed.

Here, the prescribed second speed shall be a speed of change in the flow volume of the exhaust gas such that the flow volume of the exhaust gas can decrease to the second flow volume while the reducing agent that is being transported by the first flow volume of the exhaust gas when the second flow volume reduction process starts maintains its state of diffusion. In other words, the prescribed second speed shall be such that the flow volume of the exhaust gas can decrease to the second flow volume fast enough that the exhaust gas transports the reducing agent only a distance that is sufficiently short in relation to the length of the exhaust gas purification device. If this is done, the reducing agent can more reliably be maintained in a state of diffusion throughout the entire exhaust gas purification device, with neither an excess nor a shortage.

In the method for regenerating the purification ability of the exhaust gas purification device in accordance with the present invention, the system may also be set such that, in the first flow volume reduction process, when the flow volume of the exhaust gas is set to the first flow volume, the speed of decrease in the flow volume of the exhaust gas is a prescribed third speed, which is slower than the second speed.

Here, the prescribed third speed shall be a value for the speed of change in the flow volume that is slower than the second speed, that makes it possible to control the flow volume with sufficiently high controllability when the flow volume of the exhaust gas is set to the first flow volume, and that allows sudden fluctuations in the engine torque to be adequately suppressed.

If this is done, in the first flow volume reduction process, sudden changes in the back pressure in the branch passage can be suppressed, thereby inhibiting deterioration in driveability due to sudden fluctuations in the engine torque. The flow volume of the exhaust gas can also be more accurately set to the first flow volume.

Note that the means for solving problems in accordance with the present invention can be used in all possible combinations.

BEST MODES FOR CARRYING OUT THE INVENTION

Best modes to carry out the present invention are explained in detail below as examples with reference to the drawings.

Figure 1:
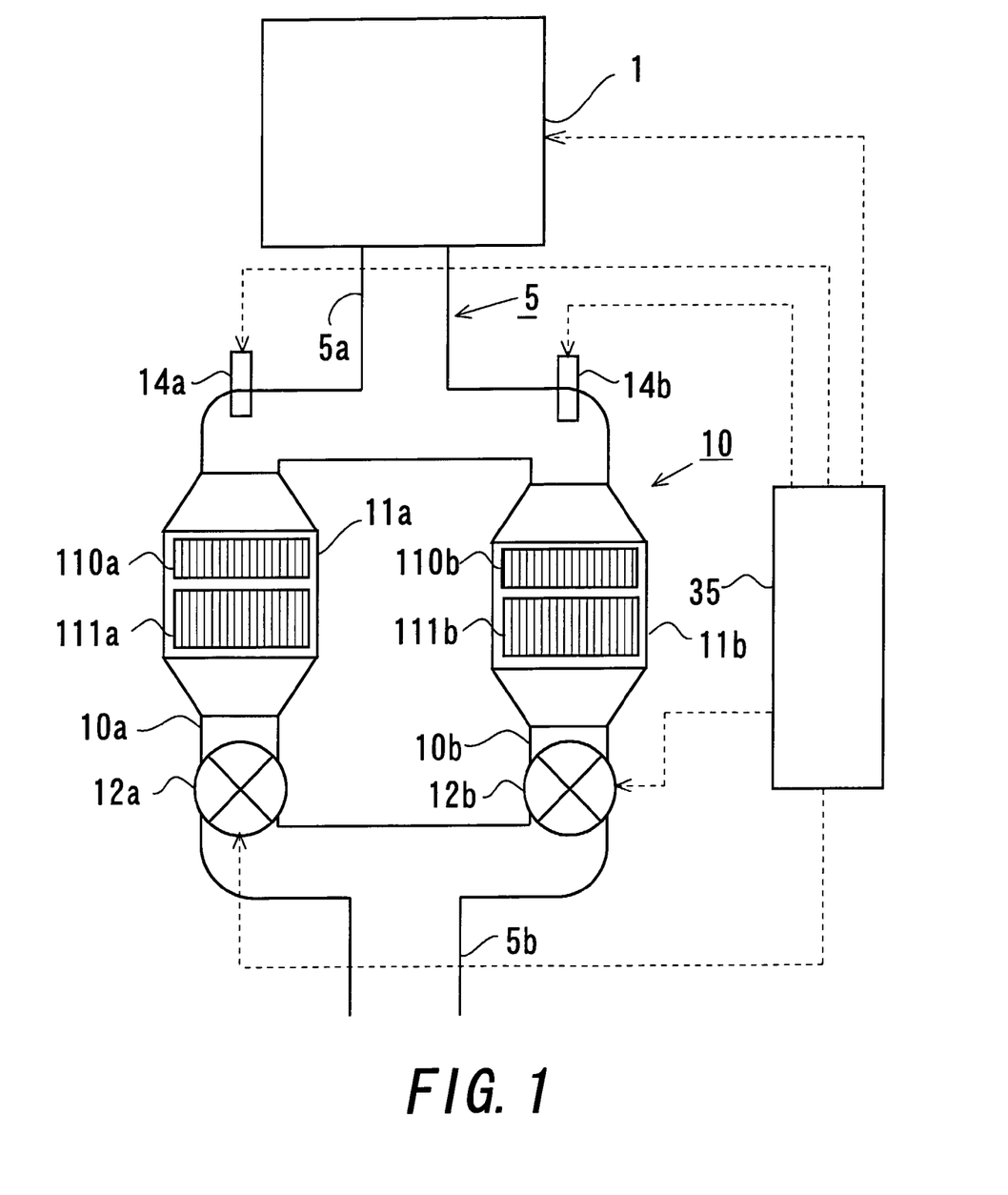
FIG. 1 is a drawing showing an overall configuration of an internal combustion engine, its exhaust system, and its control system in accordance with an embodiment of the present invention.

FIG. 1 is a drawing showing an overall configuration of an internal combustion engine, its exhaust system, and its control system in accordance with this embodiment. The internal combustion engine 1 shown in FIG. 1 is a diesel engine. In FIG. 1, the interior of the internal combustion engine 1 and its intake system are omitted.

In FIG. 1, an exhaust pipe 5, through which exhaust gas from the internal combustion engine 1 flows, is connected to the internal combustion engine 1. The exhaust pipe 5 is connected downstream to a muffler (not shown). An exhaust gas purification portion 10, which removes particulate matter (for example, soot), nitrogen oxides (NOx), and the like from the exhaust gas, is located within the exhaust pipe 5. Hereinafter, the portion of the exhaust pipe 5 that is upstream from the exhaust gas purification portion 10 is called a first exhaust pipe 5a, and the portion of the exhaust pipe 5 that is downstream from the exhaust gas purification portion 10 is called a second exhaust pipe 5b. At the entrance to the exhaust gas purification portion 10, the first exhaust pipe 5a is divided into a first branch passage 10a and a second branch passage 10b. Further downstream, the first branch passage 10a and the second branch passage 10b merge to form the second exhaust pipe 5b. A first exhaust gas purification device 11a is provided in the first branch passage 10a, and a second exhaust gas purification device 11b is provided in the second branch passage 10b. The first and second exhaust gas purification devices 11a and 11b collect particulate matter (for example, soot) from the exhaust gas and store and reduce NOx in the exhaust gas. In this embodiment, the first exhaust pipe 5a and the second exhaust pipe 5b form an exhaust gas passage, and the first branch passage 10a and the second branch passage 10b form branch passages.

In this embodiment, a first NSR 110a, in which a NOx storage-reduction catalyst is carried, and a first DPNR 111a, in which a NOx storage-reduction catalyst is carried on a filter that collects particulate matter from the exhaust gas, are arranged in series within the first exhaust gas purification device 11a. Within the second exhaust gas purification device 11b, a second NSR 110b and a second DPNR 111b are arranged in series in the same manner.

A first valve 12a, which controls the flow volume of the exhaust gas that passes through the first branch passage 10a, is provided in a portion of the first branch passage 10a that is downstream from the first exhaust gas purification device 11a. In the same manner, a second valve 12b is provided in a portion of the second branch passage 10b that is downstream from the second exhaust gas purification device 11b. In this embodiment, the first valve 12a and the second valve 12b are exhaust gas flow volume control valves.

In FIG. 1, a first fuel adding valve 14a is provided in the first branch passage 10a on the upstream side of the first exhaust gas purification device 11a. The first fuel adding valve 14a adds fuel to the exhaust gas as a reducing agent during NOx reduction processing and the like by the first exhaust gas purification device 11a. In the same manner, a second fuel adding valve 14b is provided in the second branch passage 10b on the upstream side of the second exhaust gas purification device 11b. In this embodiment, the first fuel adding valve 14a and the second fuel adding valve 14b are reducing agent addition section.

An electronic control unit (ECU) 35 is installed alongside the internal combustion engine 1 and its exhaust system configured as described above to control the internal combustion engine 1 and its exhaust system. The ECU 35 is a unit that controls the operating state and the like of the internal combustion engine 1 according to the operating conditions of the internal combustion engine 1 and requests from an driver and that also controls the exhaust gas purification portion 10 of the internal combustion engine 1.

Sensors (not shown) that are involved in control of the operating state of the internal combustion engine 1, such as a crank position sensor, an accelerator position sensor, and the like, are connected by electrical wiring to the ECU 35, and the output signals of the sensors are input to the ECU 35. Fuel injection valves and the like (not shown) in the internal combustion engine 1 are also connected by electrical wiring to the ECU 35, as are the first valve 12a, the second valve 12b, the first fuel adding valve 14a, and the second fuel adding valve 14b in this embodiment, and all of the valves are controlled by the ECU 35.

The ECU 35 is also provided with a CPU, ROM, RAM, and the like. Programs that execute various forms of control of the internal combustion engine 1, data maps, and the like are stored in the ROM. Also included among the programs stored in the ROM of the ECU 35 are a NOx reduction processing routine to reduce and discharge NOx that is stored in the first exhaust gas purification device 11a and the second exhaust gas purification device 11b and a SOx regeneration processing routine to reduce and discharge SOx that is stored in the first exhaust gas purification device 11a and the second exhaust gas purification device 11b (explains of which routines are omitted).

Figure 2:
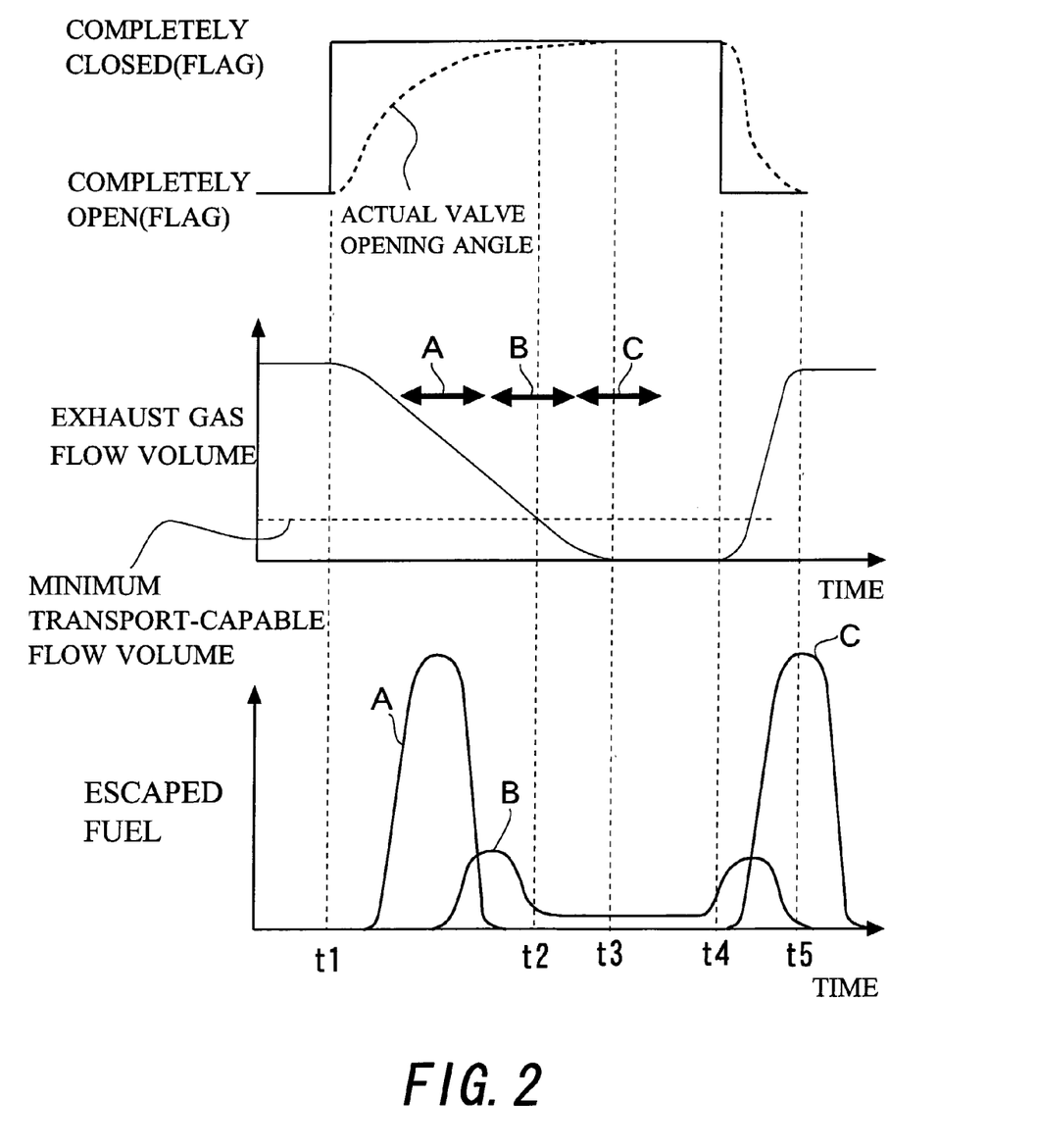
FIG. 2 is an explanatory diagram of changes in the amount of fuel that escapes in conventional NOx reduction processing, depending on the fuel addition timing.

Next, NOx reduction processing in the first exhaust gas purification device 11a will be explained as an example of control of purification ability regeneration processing in the exhaust gas purification system in this embodiment. FIG. 2 is a time chart showing control of the first valve 12a and the first fuel adding valve 14a in conventional NOx reduction processing for the first exhaust gas purification device 11a, as well as changes in the exhaust gas flow volume and in the amount of fuel that escapes from the first exhaust gas purification device 11a during conventional NOx reduction processing.

When the NOx reduction processing of the first exhaust gas purification device 11a is carried out, first, at time t1, a complete close command is output to the first valve 12a. In response to the command, the first valve 12a starts a valve-closing operation. In conjunction with the valve-closing operation of the first valve 12a, the flow volume of the exhaust gas passing through the first branch passage 10a starts to decrease. At time t2, the flow volume of the exhaust gas passing through the first branch passage 10a reaches the minimum transport-capable flow volume. The minimum transport-capable flow volume is the minimum flow volume of exhaust gas that can reliably transport downstream the reducing agent that is added from the first fuel adding valve 14a. The minimum transport-capable flow volume is equivalent to a first flow volume in this embodiment. Hereinafter, the opening angle of the first valve 12a at which the minimum transport-capable flow volume is achieved is called the minimum transport-capable opening angle. The opening angle of the first valve 12a at this time is equivalent to a first opening angle in this embodiment. At time t3, the first valve 12a reaches a completely closed state, and the flow volume of the exhaust gas passing through the first branch passage 10a becomes approximately zero.

In this process, fuel is added as a reducing agent from the first fuel adding valve 14a (described in detail later), after which the fuel diffuses throughout the entire first exhaust gas purification device 11a. At time t4, when the NOx reduction reaction in the first exhaust gas purification device 11a is thought to be complete, the ECU 35 outputs a complete open command to the first valve 12a, and the first valve 12a starts a valve-opening operation. At the same time, the flow volume of the exhaust gas passing through the first branch passage 10a starts to increase.

In the control process described above, the addition of fuel as a reducing agent from the first fuel adding valve 14a is carried out at any time in the interval between time to and time t4. The manner in which the added fuel diffuses within the first exhaust gas purification device 11a and the amount of fuel that escapes from the first exhaust gas purification device 11a differ significantly depending on the fuel addition timing. For example, if the fuel is added during interval A in FIG. 2, it is added when the exhaust gas flow volume is comparatively large, so the flow velocity when the fuel is introduced into the first exhaust gas purification device 11a is too high, and a large amount of the fuel quickly escapes from the first exhaust gas purification device 11a.

If the fuel is added during interval B in FIG. 2, in the period around time t2, when the flow volume of the exhaust gas passing through the first branch passage 10a reaches the minimum transport-capable flow volume, a large amount of the fuel does not escape from the first exhaust gas purification device 11a, as it does in the case described above. However, in this case, a portion of the added fuel does escape quickly from the first exhaust gas purification device 11a, and a portion of the added fuel fails to arrive at the first exhaust gas purification device 11a before the exhaust gas flow volume falls to zero. After the complete open command is output to the first valve 12a at time t4, the fuel that had not arrived at the first exhaust gas purification device 11a flows into the first exhaust gas purification device 11a at a high velocity and escapes.

If the fuel is added during interval C in FIG. 2, in the period around time t3, when the flow volume of the exhaust gas passing through the first branch passage 10a becomes approximately zero, almost all of the fuel fails to arrive at the first exhaust gas purification device 11a before the exhaust gas flow volume falls to zero. As a result, after the complete open command is output to the first valve 12a at time t4, almost all of the fuel escapes from the first exhaust gas purification device 11a.

Accordingly, in this embodiment, during NOx reduction processing, first, the first valve 12a is closed slowly until the minimum transport-capable opening angle is reached. Then the minimum transport-capable opening angle is maintained, and the fuel is added from the first fuel adding valve 14a during the period while the minimum transport-capable opening angle is maintained. Then, after a prescribed waiting time has elapsed, the first valve 12a is closed completely as rapidly as possible.

Figure 3:
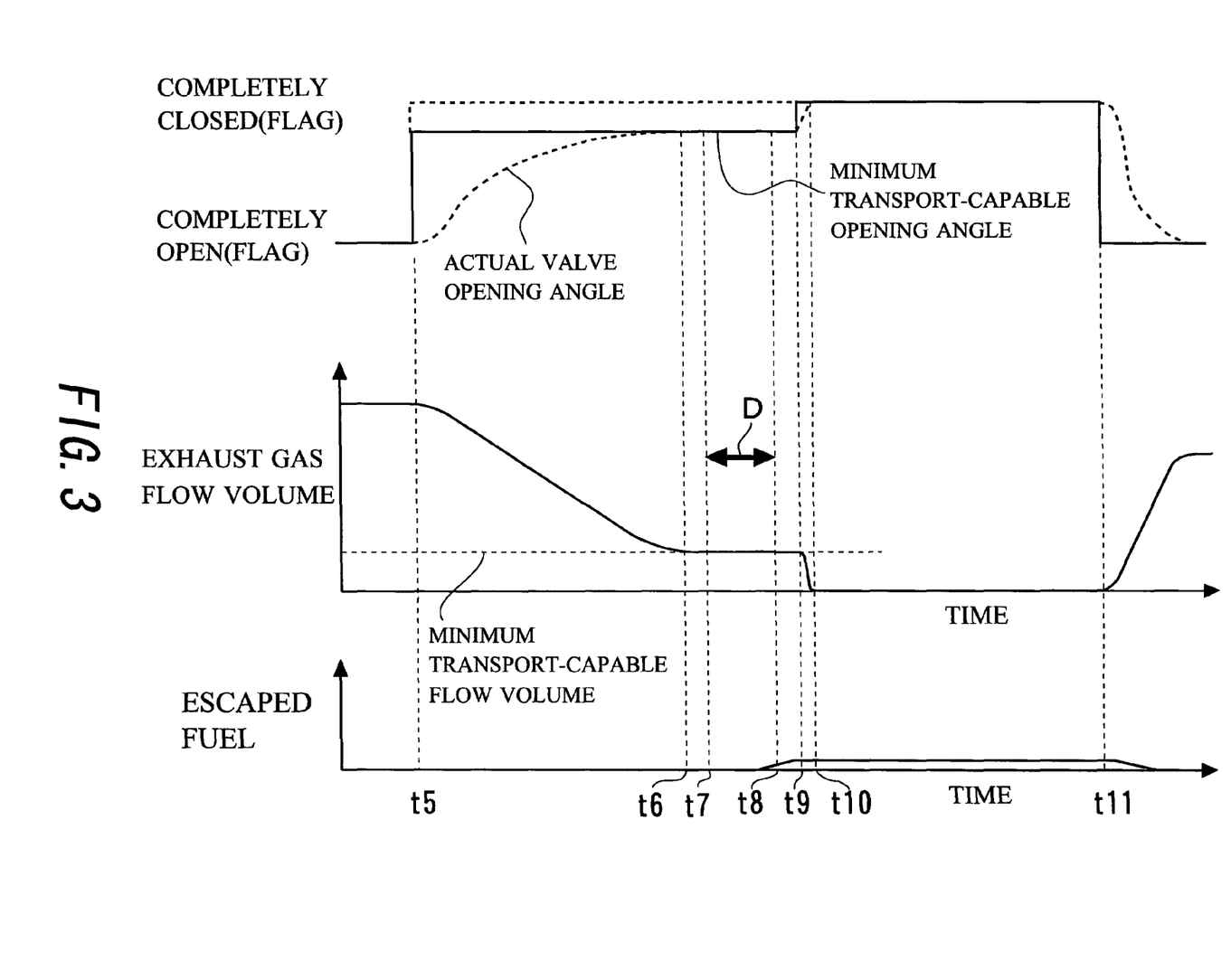
FIG. 3 is a time chart showing changes in the opening angle of a first valve, in the exhaust gas flow volume, and in the amount of fuel that escapes in NOx reduction processing in accordance with the embodiment of the present invention.

FIG. 3 is a time chart showing control of the first valve 12a and the first fuel adding valve 14a in NOx reduction processing for the first exhaust gas purification device 11a in accordance with this embodiment, as well as changes in the exhaust gas flow volume and in the amount of fuel that escapes from the first exhaust gas purification device 11a during NOx reduction processing in accordance with this embodiment.

In this embodiment, first, at time t5, a command is output to the first valve 12a, not to close completely, but to close to the minimum transport-capable opening angle. The first valve 12a then starts the valve-closing operation from a completely open state. At time t6, the minimum transport-capable opening angle is reached. In this embodiment, the value of the minimum transport-capable opening angle is mapped in relation to at least one of the parameters of engine revolution speed, engine load, intake air volume, and exhaust gas temperature. The value of the minimum transport-capable opening angle is obtained at time t5 by reading the value for each parameter from the applicable map. Also in this embodiment, the interval from time t5 to time t6 is set to be longer than the interval from time t1 to time t2. That is, the operating speed of the first valve 12a becomes slower than in the control that was explained in FIG. 2. The speed of decrease in the exhaust gas flow volume that is achieved by the lower operating speed of the first valve 12a is equivalent to a third speed in this embodiment.

The opening angle of the first valve 12a is maintained at the minimum transport-capable opening angle during the interval from time t6 to time t9. To explain the control during that interval in detail, after time t6 the system waits for the flow volume of the exhaust gas that passes through the first branch passage 10a to fall to the minimum transport-capable flow volume. At time t7, fuel addition from the first fuel adding valve 14a starts. Fuel addition ends at time t8 (after the interval D in FIG. 3), when a quantity of fuel has been added that can diffuse throughout the entire first exhaust gas purification device 11a. During the interval from time t8 until time t9, the opening angle of the first valve 12a is maintained at the minimum transport-capable opening angle. In this embodiment, the interval from time t8 to time t9 is a length of time that has been predetermined as the time required for the added fuel to reliably arrive at the first exhaust gas purification device 11a. Therefore, it is thought that at time t9, the added fuel has reliably diffused throughout the entire first exhaust gas purification device 11a.

At time t9, a complete close command is output to the first valve 12a, and the first valve 12a promptly shifts to a completely closed state at the fastest possible speed. The flow volume of the exhaust gas passing through the first branch passage 10a also decreases as rapidly as possible, becoming approximately zero at time t10. In this embodiment, the fuel that has reliably diffused throughout the entire first exhaust gas purification device 11a at time t9 is maintained in a diffused state. The fastest possible valve-closing speed for the first valve 12a is at least as fast as a first speed, and the speed of decrease in the exhaust gas flow volume that is achieved by the fastest possible valve-closing speed of the first valve 12a is equivalent to a second speed. Also in this embodiment, a second opening angle means the opening angle when the valve is in a completely closed state, that is, an opening angle of zero. A second flow volume means the flow volume when the valve is in a completely closed state, that is, a flow volume of approximately zero.

Next, the system waits for the completion of the entire reaction by which the fuel that is diffused through the entire first exhaust gas purification device 11a reduces the NOx in the first exhaust gas purification device 11a. At time t11, a complete open command is output to the first valve 12a.

When control is executed as described above, first, because the first valve 12a shifts to the minimum transport-capable opening angle slowly, the controllability of the first valve 12a is itself improved. This allows the opening angle of the first valve 12a to be set precisely to the minimum transport-capable opening angle. Sudden fluctuations in the engine torque due to changes in the back pressure in the first branch passage 10a can also be suppressed, thereby inhibiting deterioration in driveability. Next, because fuel is added while the first valve 12a is maintained at the minimum transport-capable opening angle, the transport speed of the added fuel is itself made as slow as possible. This improves the controllability of the diffusion of the added fuel throughout the first exhaust gas purification device 11a.

As described above, after the first valve 12a is set to the minimum transport-capable opening angle, the system waits for the actual flow volume of the exhaust gas passing through the first branch passage 10a to fall to the minimum transport-capable flow volume before the fuel is added. Therefore, the diffusion of the added fuel throughout the first exhaust gas purification device 11a can be controlled more accurately. Further, after the addition of fuel has been completed, the system waits until enough time has passed for the added fuel to arrive at the first exhaust gas purification device 11a and to diffuse throughout the entire first exhaust gas purification device 11a, then rapidly closes the first valve 12a. Therefore, the added fuel can be diffused more reliably throughout the entire first exhaust gas purification device 11a.

As a result of the process described above, the amount of fuel that escapes from the first exhaust gas purification device 11a can be reduced, as shown in the graph at the bottom of FIG. 3. NOx reduction processing in the first exhaust gas purification device 11a can thus be completed more reliably and efficiently.

Figure 4:
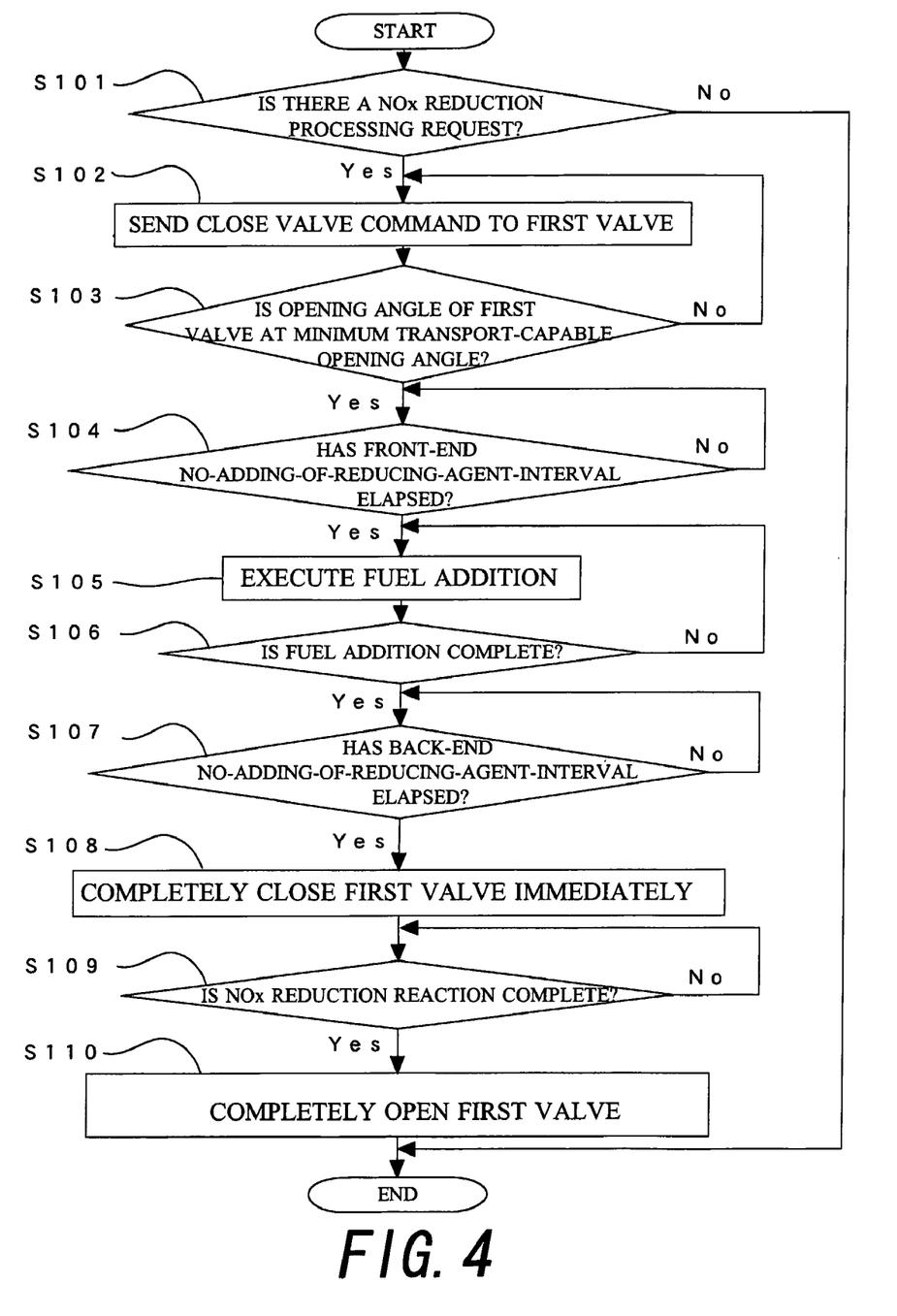
FIG. 4 is a flowchart showing a NOx reduction processing routine in accordance with the embodiment of the present invention.

FIG. 4 is a flowchart showing a NOx reduction processing routine for executing the control in this embodiment as described above. The routine is a program that is stored in the ROM in the ECU 35, and it is executed by ECU 35 at prescribed intervals during the operation of the internal combustion engine 1.

When the routine is executed, a determination is made at S101 as to whether or not a NOx reduction processing request has been output. In this embodiment, the NOx reduction processing request may be issued when a prescribed period of time has elapsed since the preceding round of NOx reduction processing was completed. The NOx reduction processing request may also be issued when the concentration of NOx in the exhaust gas flowing downstream from the first exhaust gas purification device 11a exceeds a permissible value. When it is determined at S101 that a NOx reduction processing request has not been output, the routine terminates. When it is determined that a NOx reduction processing request has been output, the routine proceeds to S102.

At S102, a close command is output to the first valve 12a. The target opening angle is set to the minimum transport-capable opening angle. In the valve-closing operation, as explained above, the valve-closing speed is set such that sufficiently good driveability and controllability of the first valve 12a can be ensured. The speed of decrease in the exhaust gas flow volume that is achieved by the valve-closing speed is the third speed. When the processing at S102 is complete, the routine proceeds to S103.

At S103, a determination is made as to whether or not the opening angle of the first valve 12a has decreased to the minimum transport-capable opening angle. Specifically, the determination may be made by providing an opening angle sensor that detects the opening angle of the first valve 12a and by sending the sensor output to the ECU 35. When it is determined that the opening angle of the first valve 12a has not decreased to the minimum transport-capable opening angle, the routine returns to the processing at S102 and continues the closing operation of the first valve 12a. When it is determined that the opening angle of the first valve 12a has decreased to the minimum transport-capable opening angle, the routine proceeds to S104.

At S104, a determination is made as to whether or not a front-end no-adding-of-reducing-agent interval has elapsed since the opening angle of the first valve 12a decreased to the minimum transport-capable opening angle. Here, the front-end no-adding-of-reducing-agent interval is the interval from the time when the opening angle of the first valve 12a decreases to the minimum transport-capable opening angle until the flow volume of the exhaust gas passing through the first branch passage 10a stabilizes at the minimum transport-capable flow volume. It is the equivalent of the interval from t6 to t7 in FIG. 3.

At S104, when it is determined that the front-end no-adding-of-reducing-agent interval has not elapsed since the opening angle of the first valve 12a decreased to the minimum transport-capable opening angle, the routine repeats the processing at S104 until the front-end no-adding-of-reducing-agent interval has elapsed. When it is determined that the front-end no-adding-of-reducing-agent interval has elapsed since the opening angle of the first valve 12a decreased to the minimum transport-capable opening angle, the flow volume of the exhaust gas flowing through the first branch passage 10a is judged to have stabilized sufficiently at the minimum transport-capable flow volume, and the routine proceeds to S105.

At S105, the addition of fuel as a reducing agent from the first fuel adding valve 14a starts. When the processing at S105 is complete, the routine proceeds to S106.

At S106, a determination is made as to whether or not the required amount of fuel has been added from the first fuel adding valve 14a. Specifically, a determination is made as to whether or not an amount of fuel has been added from the first fuel adding valve 14a that will diffuse throughout the entire first exhaust gas purification device 11a. The amount of fuel is determined in advance, based on the capacity of the first exhaust gas purification device 11a and the like. When it is determined that an amount of fuel that will diffuse throughout the entire first exhaust gas purification device 11a has not yet been added, the routine returns to S105 and continues the addition of fuel from the first fuel adding valve 14a. When it is determined that an amount of fuel that will diffuse throughout the entire first exhaust gas purification device 11a has been added, the addition of fuel stops and the routine proceeds to S107.

At S107, a determination is made as to whether or not a back-end no-adding-of-reducing-agent interval has elapsed since the addition of fuel from the first fuel adding valve 14a was completed (stopped). Here, the back-end no-adding-of-reducing-agent interval is the interval from the time when fuel addition stops until it is thought that the added fuel has arrived at and diffused throughout the entire first exhaust gas purification device 11a, when the flow volume of the exhaust gas passing through the first branch passage 10a is at the minimum transport-capable flow volume. It is the equivalent of the interval from t8 to t9 in FIG. 3.

At S107, when it is determined that the back-end no-adding-of-reducing-agent interval has not elapsed, the routine repeats the processing at S107. That is, the processing at S107 is repeated until it is determined that the back-end no-adding-of-reducing-agent interval has elapsed. When it is determined at S107 that the back-end no-adding-of-reducing-agent interval has elapsed, it is judged that the added fuel has diffused sufficiently in the first exhaust gas purification device 11a, and the routine proceeds to S108.

At S108, the first valve 12a closes rapidly. At this time, as described above, the valve-closing speed is at least faster than the valve-closing speed in the valve-closing operation at S102 and is the fastest possible valve-closing speed for the first valve 12a. The speed of decrease in the exhaust gas flow volume that is achieved by this valve-closing speed is equivalent to the second speed in this embodiment. This allows the flow volume of the exhaust gas passing through the first branch passage 10a to be reduced to approximately zero as fast as possible, thereby allowing the fuel to be maintained in a diffused state throughout the entire first exhaust gas purification device 11a. When the processing at S108 is complete, the routine proceeds to S109.

At S109, after the first valve 12a is closed completely at S108, a determination is made as to whether or not the NOx reduction reaction in the first exhaust gas purification device 11a has been completed. Specifically, a determination may be made as to whether or not a reaction time has elapsed that is based on the amount of NOx accumulated in the first exhaust gas purification device 11a when the current round of NOx reduction processing started and on the amount of fuel that was added in the processing from S105 to S106. When it is determined that the NOx reduction reaction has not been completed, the routine repeats the processing at S109 until the NOx reduction reaction has been completed. When it is determined at S109 that the NOx reduction reaction has been completed, the routine proceeds to S110.

At S110, a complete open command is output to the first valve 12a, and the first valve 12a reaches a completely open state. When the processing at S110 is complete, the routine terminates.

Note that in the flow described above, the processing at S102 and S103 is equivalent to a first flow volume reduction process. Also, the processing from S104 to S107 is equivalent to a reducing agent addition process. Further, the processing at S108 is equivalent to a second flow volume reduction process. Finally, the ECU 35, which executes the NOx reduction processing routine described above, serves as the purification ability regeneration control section in this embodiment.

In the embodiment described above, the NOx reduction processing in the first exhaust gas purification device 11a was explained. Note that the control of the NOx reduction processing in the second exhaust gas purification device 11b can be explained in the same manner simply by substituting the second branch passage 10b for the first branch passage 10a, the second exhaust gas purification device 11b for the first exhaust gas purification device 11a, the second valve 12b for the first valve 12a, and the second fuel adding valve 14b for the first fuel adding valve 14a.

In the embodiment described above, when the first valve 12a closes to the minimum transport-capable opening angle, the valve-closing speed of the first valve 12a during valve-closing may be controlled at the desired speed by feedback control. That is, feedback control may be used to keep the speed at which the opening angle of the first valve 12a changes at a speed that allows for the highest degree of control or at a speed such that the valve-closing operation of the first valve 12a affects driveability only slightly.

This makes it possible to control the minimum transport-capable opening angle of the first valve 12a more precisely, or else to more reliably suppress deterioration of driveability due to torque shock.

In the embodiment described above, an example of the application of the present invention to NOx reduction processing in the first exhaust gas purification device 11a was explained, but the present invention may also be applied to other purification ability regeneration processing that is achieved by adding a reducing agent in the first exhaust gas purification device 11a. Examples of other purification ability regeneration processing may include SOx regeneration processing and particulate matter (PM) regeneration processing.

For example, when the present invention is applied to SOx regeneration processing, the processing flow described above may be used, or the S108 and S109 in FIG. 4 may be omitted, so that the processing from S101 to S107, plus S110, is repeated a plurality of times. If this is done, the control procedure in which fuel is added while the opening angle of the first valve 12a is at the minimum transport-capable opening angle can be continuously executed a plurality of times, allowing the control proceed to be better applied to SOx regeneration processing.

In the embodiment described above, the execution of NOx reduction processing and the like by adding fuel as a reducing agent to a NOx storage-reduction catalyst was explained, but a selective NOx storage catalyst system can also be applied that reduces NOx in exhaust gas by supplying a urea-water solution as a reducing agent to the exhaust gas passage.

In the embodiment described above, the control procedure that was explained was for NOx reduction processing in an exhaust gas purification device that is provided in one of two branch passages in an exhaust gas purification system in which the exhaust gas passage is divided into two branch passages. But the present invention may also be applied where NOx reduction processing is carried out in an exhaust gas purification device that is provided in any branch passage in an exhaust gas purification system in which the exhaust gas passage is divided into three or more branch passages.

In the embodiment described above, the first opening angle is defined as the minimum transport-capable opening angle that achieves the minimum transport-capable flow volume, which is the minimum exhaust gas flow volume that can reliably transport downstream the reducing agent that is added by the first fuel adding valve 14a. But the first opening angle is not limited by this example. As long as the first opening angle is made smaller than the opening angle of the first valve 12a prior to the start of NOx reduction processing, the present invention will be effective to some extent.

In the embodiment described above, the second opening angle is defined as the opening angle when the valve is in a completely closed state, but the second opening angle is not limited by this example. It may be any angle that ensures sufficient time for the fuel that is added by the first fuel adding valve 14a to diffuse and react within the first exhaust gas purification device 11a.

INDUSTRIAL APPLICABILITY

Applying the present invention in an exhaust gas purification system that combines a plurality of branch passages branching off from an exhaust gas passage with exhaust gas purification devices that are provided in each passage makes it possible to regenerate the purification ability of the exhaust gas purification devices more reliably and more efficiently.

The invention claimed is:

1. An exhaust gas purification system for an internal combustion engine, comprising:
    an exhaust gas passage, one end of which is connected to the internal combustion engine and through which exhaust gas from the internal combustion engine passes, and which is divided into a plurality of branch passages;
    an exhaust gas purification device provided in each of the plurality of branch passages, each exhaust gas purification device purifying the exhaust gas that passes through the branch passage in which it is provided;
    an exhaust gas flow volume control valve provided in each of the plurality of branch passages, each exhaust gas flow volume control valve controlling a flow volume of the exhaust gas that passes through the branch passage in which it is provided;
    a reducing agent addition section provided in each of the plurality of branch passages upstream from the exhaust gas purification device, each reducing agent addition section adds a reducing agent to the exhaust gas that passes through the branch passage in which it is provided;
    a purification ability regeneration control section, wherein
        when the reducing agent is supplied to the exhaust gas purification device that is provided in one of the plurality of branch passages and regeneration processing of the purification ability of the exhaust gas purification device is carried out, in the branch passage where the exhaust gas purification device is provided in which the regeneration processing is to be carried out, an opening angle of the exhaust gas flow volume control valve is set to a prescribed first opening angle that is closer to being closed than the opening angle was before the regeneration processing started;
        the reducing agent is added from the reducing agent addition section during a period when the opening angle of the exhaust gas flow volume control valve is maintained at the first opening angle; and
        after addition of the reducing agent is complete, the opening angle of the exhaust gas flow volume control valve is set to a prescribed second opening angle that is closer to being closed than the first opening angle; and
    a prescribed no-adding-of-reducing-agent interval, during which the reducing agent is not added, is provided during at least one of a time before and a time after the period when the reducing agent is added during the period when the opening angle of the exhaust gas flow volume control valve is maintained at the first opening angle.

2. The exhaust gas purification system for an internal combustion engine according to claim 1, wherein
    when the purification ability regeneration control section reduces the opening angle of the exhaust gas flow volume control valve from the first opening angle to the second opening angle, the exhaust gas flow volume control valve closes at a speed that is at least as fast as a prescribed first speed.

3. The exhaust gas purification system for an internal combustion engine according to claim 1, wherein
    when the purification ability regeneration control section reduces the opening angle of the exhaust gas flow volume control valve to the first opening angle, the valve closes at a speed that is slower than the speed at which the exhaust gas flow volume control valve closes when, after the reducing agent is added, the opening angle of the exhaust gas flow volume control valve is reduced from the first opening angle to the second opening angle.

4. The exhaust gas purification system for an internal combustion engine according to claim 2, wherein
when the purification ability regeneration control section reduces the opening angle of the exhaust gas flow volume control valve to the first opening angle, the valve closes at a speed that is slower than the speed at which the exhaust gas flow volume control valve closes when, after the reducing agent is added, the opening angle of the exhaust gas flow volume control valve is reduced from the first opening angle to the second opening angle.

5. A method for regenerating a purification ability of an exhaust gas purification device for an internal combustion engine, which method regenerates the purification ability by supplying a reducing agent to any one exhaust gas purification device that is provided in any one of a plurality of branch passages that are formed by branching off from an exhaust gas passage of the internal combustion engine, comprising:
a first flow volume reduction process, which, in the branch passage where the exhaust gas purification device is provided in which the purification ability is to be regenerated, reduces the flow volume of the exhaust gas to a prescribed first flow volume, which is less than the flow volume prior to the start of regeneration;
a reducing agent addition process, which is carried out after the first flow volume reduction process, maintains the flow volume of the exhaust gas at the first flow volume, and adds the reducing agent to the exhaust gas;
a second flow volume reduction process, which is carried out after the reducing agent addition process and reduces the flow volume of the exhaust gas to a prescribed second flow volume that is less than the first flow volume, wherein
in the reducing agent addition process, during at least one of a time before and a time after the period in which the reducing agent is added, a prescribed no-adding-of-reducing-agent interval is provided during which the flow volume of the exhaust gas is maintained at the first flow volume and the reducing agent is not added.

6. The method for regenerating a purification ability of an exhaust gas purification device according to claim 5, wherein
in the second flow volume reduction process, when the flow volume of the exhaust gas is reduced to the second flow volume, the speed of decrease in the flow volume of the exhaust gas is a prescribed second speed.

7. The method for regenerating a purification ability of an exhaust gas purification device according to claim 5, wherein
in the first flow volume reduction process, when the flow volume of the exhaust gas is reduced to the first flow volume, the speed of decrease in the flow volume of the exhaust gas is a prescribed third speed, which is slower than the speed of decrease in the flow volume of the exhaust gas when the flow volume of the exhaust gas is reduced to the second flow volume in the second flow volume reduction process.

8. The method for regenerating a purification ability of an exhaust gas purification device according to claim 6, wherein
in the first flow volume reduction process, when the flow volume of the exhaust gas is reduced to the first flow volume, the speed of decrease in the flow volume of the exhaust gas is a prescribed third speed, which is slower than the speed of decrease in the flow volume of the exhaust gas when the flow volume of the exhaust gas is reduced to the second flow volume in the second flow volume reduction process.

* * * * *